(12) United States Patent
Ahn et al.

(10) Patent No.: US 6,488,454 B1
(45) Date of Patent: Dec. 3, 2002

(54) METHOD FOR MACHINING SHOE POCKET FOR PISTON IN VARIABLE DISPLACEMENT SWASH PLATE TYPE COMPRESSOR

(75) Inventors: Hew Nam Ahn, Taejon-si (KR); Young-seop Yoon, Taejon-si (KR)

(73) Assignee: Halla Climate Control Corp., Daejon (KR)

( * ) Notice: Subject to any disclaimer, the term of this patent is extended or adjusted under 35 U.S.C. 154(b) by 0 days.

(21) Appl. No.: 09/655,661

(22) Filed: Sep. 6, 2000

(51) Int. Cl.[7] .............................. B23C 3/34; B23B 5/00
(52) U.S. Cl. .................. 409/132; 409/143; 409/165; 409/200; 82/1.11; 451/50; 29/888.04; 29/898.048
(58) Field of Search .............................. 409/132, 143, 409/165, 199, 200; 29/888.04, 898.048; 451/50; 82/1.11

(56) References Cited

U.S. PATENT DOCUMENTS

| | | | |
|---|---|---|---|
| 3,212,405 A | * 10/1965 | Smith et al. ................ | 409/132 |
| 5,823,721 A | 10/1998 | Wagenseil | |
| 6,053,081 A | 4/2000 | Kimura et al. | |
| 6,415,695 B1 | * 7/2002 | Ootsuki ........................ | 82/1.11 |
| 2001/0022122 A1 | * 9/2001 | Kawai et al. ................ | 82/1.11 |
| 2002/0071731 A1 | * 6/2002 | Ootsuki ........................ | 409/132 |

FOREIGN PATENT DOCUMENTS

| | | | |
|---|---|---|---|
| DE | 3920969 A1 | * | 1/1991 |
| JP | 59-166407 A | * | 9/1984 |
| JP | 6-249140 A | * | 9/1994 |
| JP | 10-220354 A | * | 8/1998 |
| JP | 2001-47303 A | * | 2/2001 |

* cited by examiner

*Primary Examiner*—A. L. Wellington
*Assistant Examiner*—Erica E Cadugan

(57) ABSTRACT

A method for machining a pair of shoe pockets for piston in a swash plate type compressor is disclosed. In this method, the shoe pockets are respectively formed on the opposed walls of the slot in the piston of the compressor while conforming to a single imaginary sphere. The method comprises the step of moving a cutter provided with an arc-shaped cutter blade that has a rotation diameter less than the width of the slot. Thereafter, there is performed the step of relatively revolving the cutter with regard to the piston by allowing the central axis of a revolved part to move along a circular orbit within the slot while rotating the cutter, so as to cut the shoe pockets to conform to the single imaginary sphere. Finally, the step of retreating the cutter out of the slot when the cutter completes one round revolution and is returned to its initial position is performed.

3 Claims, 6 Drawing Sheets

Prior Art

METHOD FOR MACHINING SHOE POCKET FOR PISTON IN VARIABLE DISPLACEMENT SWASH PLATE TYPE COMPRESSOR

BACKGROUND OF THE INVENTION

1. Field of the Invention

The present invention relates, in general, to a method for machining a piston for a variable displacement swash plate type compressor, the pistons being fitted over the peripheral portion of a swash plate and reciprocated in the bores of a cylinder by the rotation of the swash plate owing to the rotation of a drive shaft. In particular, the present invention relates to a method for machining a pair of shoe pocket for a piston in a variable displacement swash plate type compressor, which is capable of cutting the shoe pocket, conforming to a single imaginary sphere, respectively on the opposed walls of a slot in the piston of the compressor.

2. Description of the Prior Art

A compressor constituting one of the main elements of an air-conditioning apparatus for automobiles is an apparatus that selectively receives power from an engine by the intermittence action of an electromagnetic clutch, converts refrigerant gas supplied from an evaporator to a state of high temperature and high pressure by means of a compressing process, and discharges the refrigerant gas to the condenser.

A swash plate type compressor is operated in such a way that a swash plate mounted around a drive shaft while being inclined and shaped in the form of a disk is rotated together with the drive shaft and a plurality of pistons fitted over the peripheral portion thereof are linearly reciprocated in the bores of a cylinder by the rotation of the swash plate. In the process of the reciprocating movement of the pistons, refrigerant gas is sucked into the compressor, compressed in the cylinder bore, and discharged to a condenser.

FIG. 1 is a sectional view showing a typical variable displacement swash plate type compressor that can variably compress refrigerant gas.

As illustrated in FIG. 1, the variable displacement swash plate type compressor comprises front and rear housings 1 and 2, a cylinder block 3 having a plurality of circumferentially arranged bores 3a and being positioned between the front and rear housings 1 and 2, a drive shaft 4 rotatably mounted across the interiors of the front housing 1 and the cylinder block 3, a circular lug plate 5 fixed around the drive shaft 4 and rotated together with the drive shaft 4, a swash plate 6 mounted around the drive shaft 4 and connected to one side of the lug plate 5 by means of hinge structures 5a and 6a, a plurality of pistons 8 fitted over the peripheral portion of the swash plate 6 via a pair of shoes 7 and respectively reciprocated in the bores 3a of the cylinder 3 by the rotation of the peripheral portion of the swash plate 6 owing to the rotation of the drive shaft 4, and a suction reed valve 10 and a discharge reed valve 11 selectively opening and closing the inlet 9a and outlet 9b of a valve plate 9 by pressure variation in the cylinder bore 3a. The variable displacement swash plate type compressor further comprises a control valve 12 for controlling the stroke of pistons 8 by regulating the pressure of the crank chamber 1a of the front housing 1, and the suction chamber 2a and discharge chamber 2b of the rear housing 2.

The variable displacement swash plate type compressor constructed as described above compresses refrigerant gas supplied from an evaporator and discharges it to a condenser.

When the drive shaft 4 is rotated by means of the power of an engine, the lug plate 5 fixedly fitted around the drive shaft 4 is rotated together with the swash plate 6 and the pistons 8 fitted over the peripheral portion of the swash plate 6 are reciprocated at a distance proportional to the inclination angle of the swash plate 6. In the process of the reciprocation of the pistons 8, refrigerant gas supplied from an evaporator is sucked from the suction chamber 2a through the inlet 9a into the bores 3a while each piston 8 is moved rearward (in a right direction in FIG. 1), and the refrigerant gas sucked into the bores 3a is compressed by the compressing action of the piston 8 and discharged to the discharge chamber 2b through the outlet 9b at a high pressure and, thereafter, discharged to a condenser(not shown) while the piston 58 reaches the bottom dead point and moves forward.

In the above refrigerant gas compressing process, the swash plate 6 performs a rotating movement, whereas the piston 8 fitted over the peripheral portion of the swash plate 6 and reciprocated by the rotation of the swash plate 6 performs a repeated linear movement back and forth.

Referring to FIGS. 1 and 2, the shoes 7 are semispherical bodies, each of the shoes 7 having a plane and a semispherical surface. The shoes 7 are respectively situated in shoe pocket 83 and 84 that are respectively formed on both opposed walls 81 and 82 of the slot 80 of the piston 8. Therefore, the shoes 7 are situated between the piston 8 and the swash plate 6 and are respectively slid on the shoe pocket 83 and 84 by the variation of the inclination angle of the swash plate 6 while the swash plate 6 is rotated, so that the variation of the inclination angle of the swash plate 6 is accommodated by the sliding of the shoes 7 and, consequently, the wobbling force of the peripheral portion of the swash plate 6 can be transmitted to the piston without hindrance.

Meanwhile, the shoe pocket 83 and 84 on which the shoes 7 are situated and which are formed on the opposed walls 81 and 82 of the slot 80 of the piston 8 should have curved surfaces corresponding to the semispherical surfaces of the shoes 7. In order to allow the shoes 7 to perform a sliding rotation, the curvature centers of the shoe pocket 83 and 84 should coincide with each other and the curvature centers of the shoe pockets 83 and 84 should coincide respectively with the curvature centers of the shoes 7. This means that the two shoe pockets 83 and 84 preferably conform to a single imaginary sphere I.

The present invention is concerned with a method for precisely machining two shoe pockets 83 and 84 on both opposed walls 81 and 82 of the slot 80 of the piston 8 so that the shoe pockets 83 and 84 conform to the imaginary sphere I.

The knotty point in precisely machining the shoe pockets 83 and 84 is that the two shoe pockets 83 and 84 should conform to the single imaginary sphere I having a spherical center at the center of the slot of the piston 8, but a cutter 100 having a spherical cutter blade cannot be inserted into the slot so as to machine the shoe pockets 83 and 84 because the space between the opposed walls 81 and 82 of the slot of the piston 8 is narrow in comparison with the diameter of the imaginary sphere I.

In order to overcome the problem, U.S. Pat. No. 6,053, 081 issued on Apr. 25, 2000 discloses a method for machining a pair of shoe pockets in a compressor piston.

As illustrated in FIG. 2, the US patent discloses a method for machining a pair of shoe pockets 83 and 84, which conforms to the imaginary sphere I, on the opposed walls 81 and 82 of the slot 80 of a compressor piston 8, wherein the slot 80 is narrower than the diameter of the imaginary sphere I. In the method for machining a pair of shoe pockets 83 and 84, there is provided an asymmetrical cutter blade 101 that is, at its widest point, narrower than the slot as measured in the direction of the longitudinal axis $L_1$ of the piston 8, wherein the cutter blade 101 generates a sphere if rotated about a cutter axis. One of the cutter blade 101 and the piston 8 is moved with respect to the other such that the cutter blade 101 enters the slot without contacting either of the opposed walls 81 and 82, wherein the cutter blade 101 has a center point that coincides with the center of the generated sphere, and wherein the generated sphere is the same size as the imaginary sphere I. The piston 8 is rotated about a machining axis $L_2$ to simultaneously machine the shoe pockets 83 and 84, wherein the machining axis $L_2$ intersects the center point of the cutter blade 101. One of the cutter blade 101 and the piston 8 is moved with respect to the other to remove the cutter blade 101 from the slot 80 without contacting either of the opposed walls 81 and 82.

However, in said US patent method, since the shoe pockets 83 and 84 conforming to the single imaginary sphere I can be machined only if the curvature center of the cutter 100 coincides with the rotating center of the piston 8 and the moving distance of the cutter 100 in the slot 80 of the piston 8 is to be accurate, there is difficulty in managing the machining dimensions. That is, since the piston is to be rotated about axis L1 while the cutter 100 is to be moved linearly along the axis L2, the shoe pockets 83 and 84 are apt to be biased to one side or may not conform to the imaginary sphere I if the relative position of the piston 8 and the cutter 100 with regard to each other or the moving distance of the cutter 100 is slightly deviated from a specified value. Further, in this US patent invention, it is not easy to get rid of unfavorable vibration of the piston during its rotation due to its asymmetrical feature. More further, in this US patent, it is not easy to move precisely the cutter such that its center is located on the rotation axis of the piston. As a result, there is difficulty in machining the piston so as to prevent the compressor from being operated improperly.

SUMMARY OF THE INVENTION

Accordingly, the present invention has been made keeping in mind the above problems occurring in the prior art, and an object of the present invention is to provide a method for machining a pair of shoe pockets for piston in a swash plate type compressor, which is capable of cutting shoe pockets, which conform to a single imaginary sphere, on the opposed walls of a piston slot by rotating a cutter having an arc-shaped cutter blade and, simultaneously, revolving it around the axis of the piston slot within the piston slot, thereby improving the dimensional precision of machining.

In order to accomplish the above object, the present invention provides a method for machining a pair of shoe pockets for piston in a swash plate type compressor so that the shoe pockets are respectively formed on the opposed walls of the slot in the piston of the compressor while conforming to a single imaginary sphere, comprising the steps of: moving a cutter provided with an arc-shaped cutter blade that has a rotation diameter less than the width of the slot; relatively revolving the cutter with regard to the piston by allowing the central axis of an actually revolved part to move along a circular orbit within the slot while rotating the cutter, so as to cut the shoe pockets to conform to the single imaginary sphere; and retreating the cutter out of the slot when the cutter completes one round revolution and is returned to its initial position.

In an embodiment, the relatively revolving of the cutter with regard to the piston may be performed by allowing the rotation axis of the cutter to move along the circular orbit within the slot while fixing the piston.

In another embodiment, the relatively revolving of the cutter with regard to the piston may be performed by allowing the piston to move along the circular orbit within the slot while fixing the rotation axis of the cutter.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
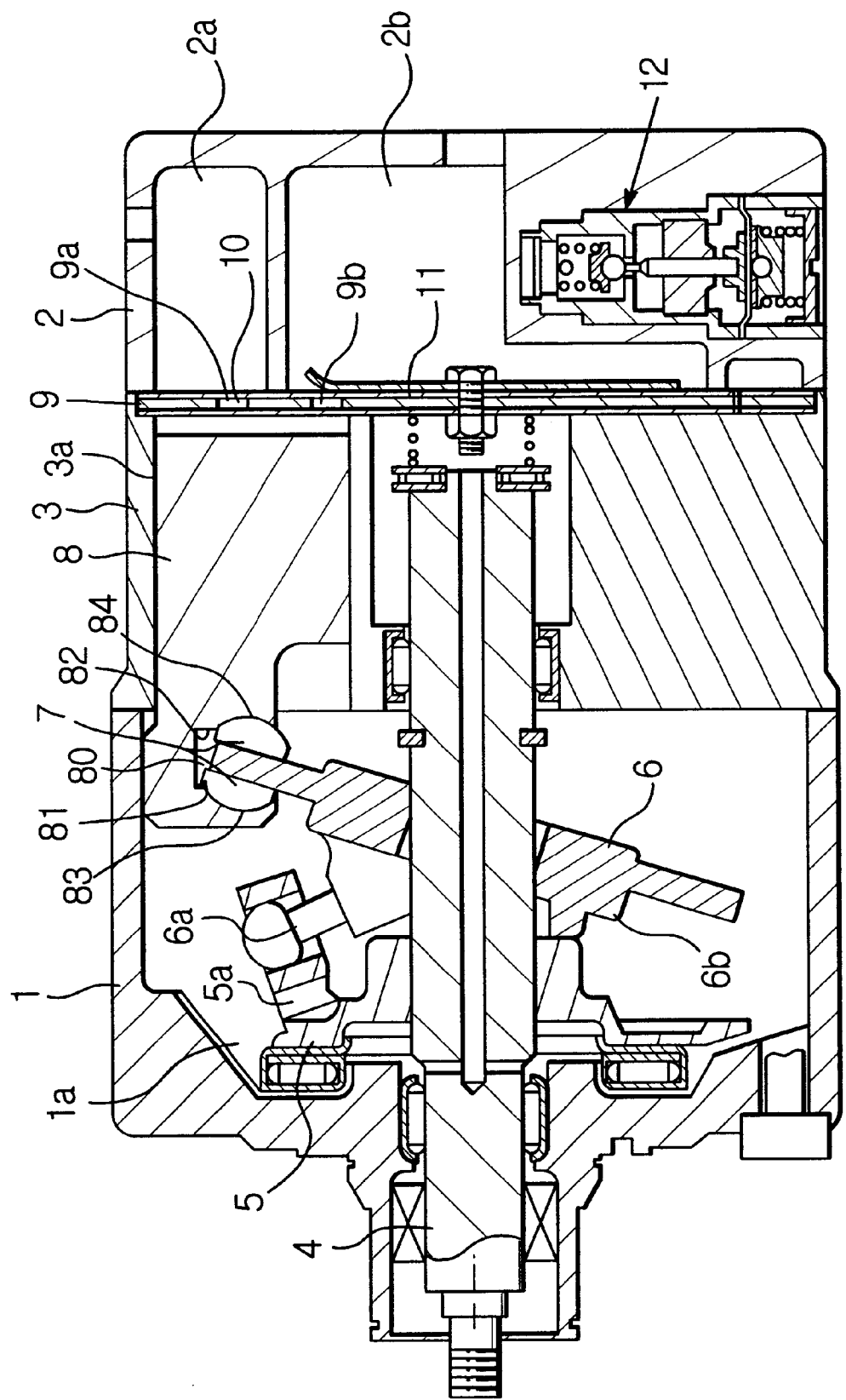
FIG. 1 is a sectional view of a typical variable displacement swash plate type compressor.
Figure 2:
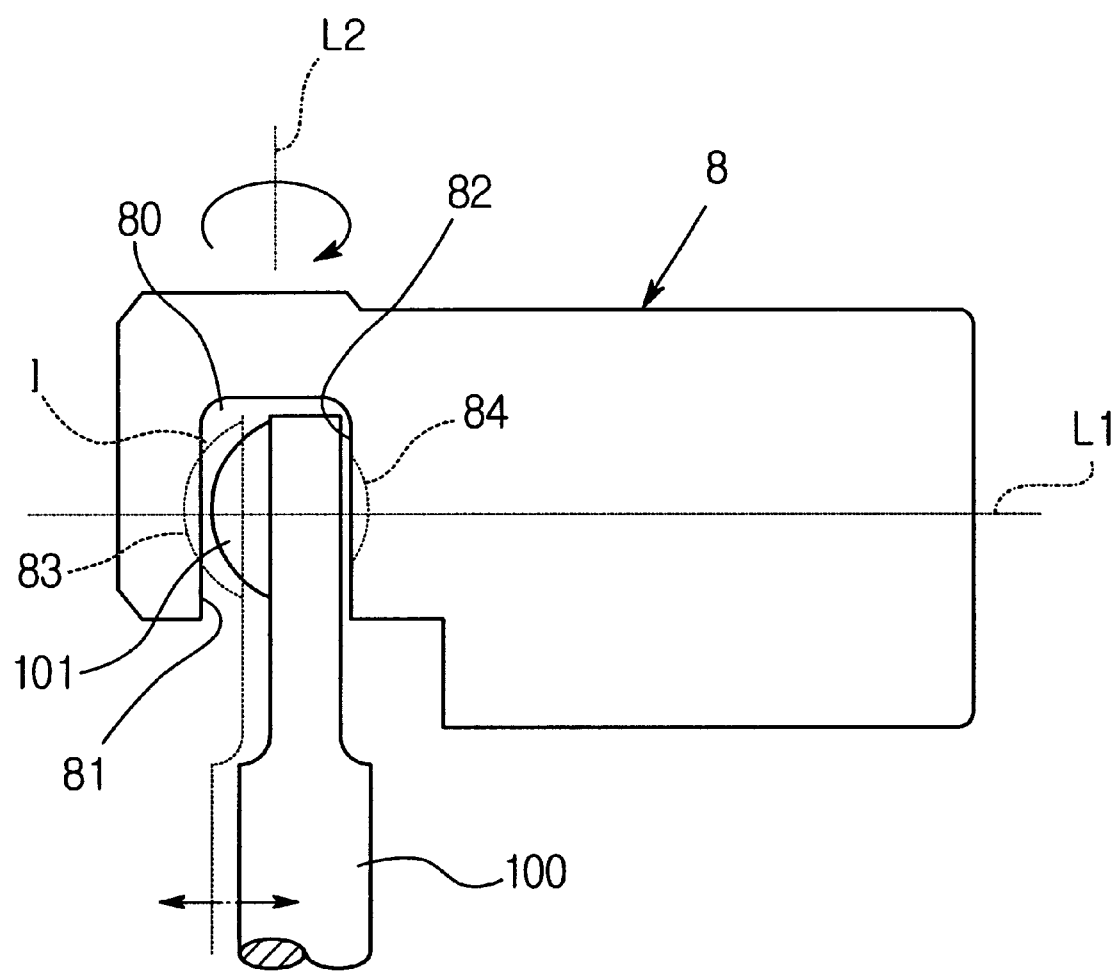
FIG. 2 is a view illustrating a shoe pocket machining method disclosed in the U.S. Pat. No. 6,053,081.

Reference now should be made to the drawings, in which the same reference numerals are used throughout the different drawings to designate the same or similar components.

Figure 3:
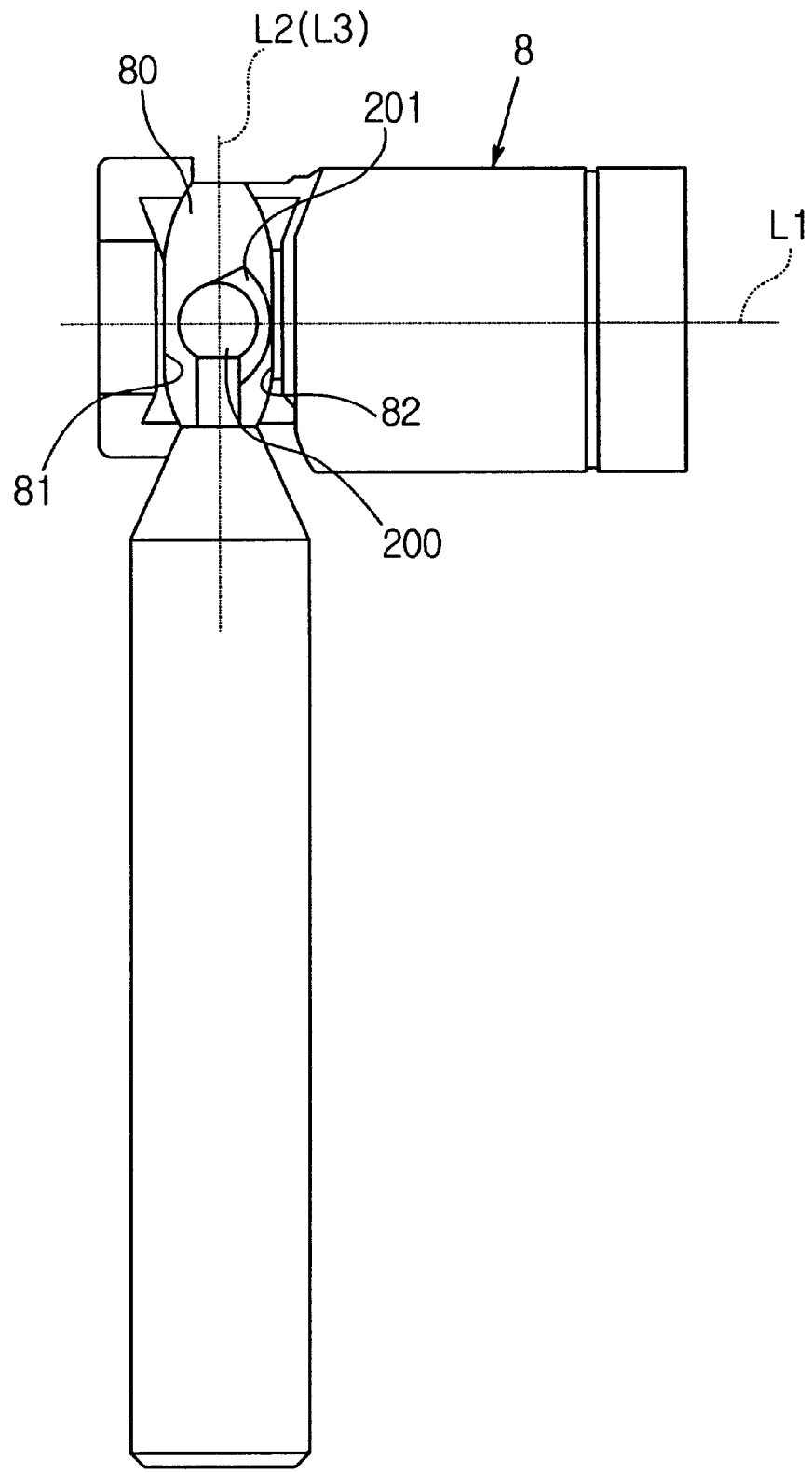
FIG. 3 is a view showing the initial stage of a shoe pocket machining method in accordance with the present invention.
Figure 4:
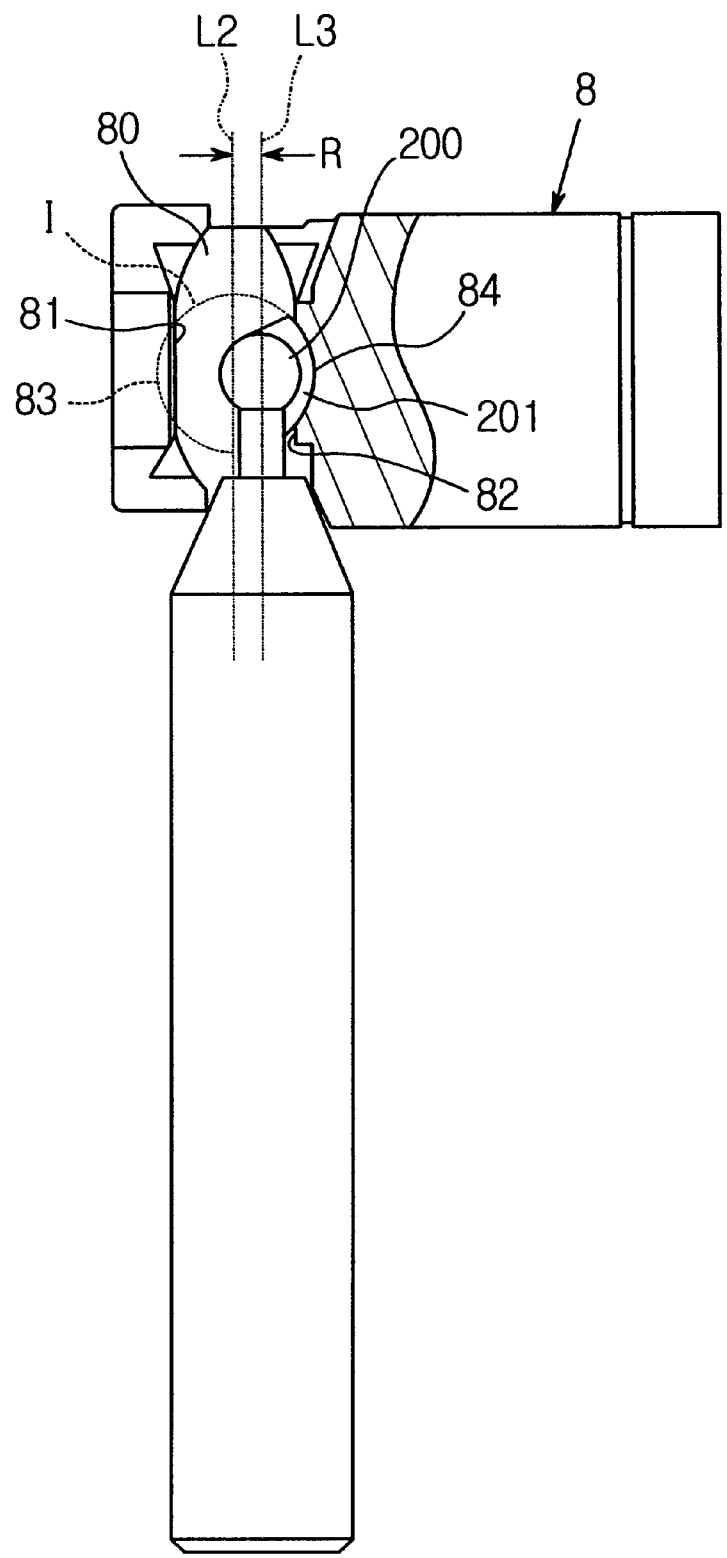
FIG. 4 is a view showing the cutting stage of the shoe pocket machining method in accordance with the present invention.

FIG. 3 is a view showing the initial stage of a shoe pocket machining method in accordance with the present invention and FIG. 4 is a view showing the cutting stage of the shoe pocket machining method in accordance with the present invention.

As shown in FIGS. 3 and 4, in the shoe pocket machining method in accordance with the present invention, there is employed a cutter 200 having an arc-shaped cutter blade 201. The arc-shaped cutter blade 201 is rotated around its rotation axis $L_3$. As illustrated in FIG. 4, the cutter blade 201 has a curvature identical to that of an imaginary sphere I to which the two shoe pockets 83 and 84 should conform, and has a maximum width narrower than the half of the width of the slot 80. As a result, if the cutter blade 201 is rotated in a state where the rotation axis L3 of the cutter blade 201 coincides with the central axis L2 of the slot 80, the cutter blade 201 does not come into contact with either of the opposed walls 81 and 82 of the slot 80 of the piston 8. While the cutter 200 is rotated around its rotation axis L3 and, simultaneously, is revolved around the axis L2, the cutter 200 cuts the shoe pockets 83 and 84, which conforms to the imaginary sphere I, on the opposed walls 81 and 82 of the slot 80.

Figure 5:
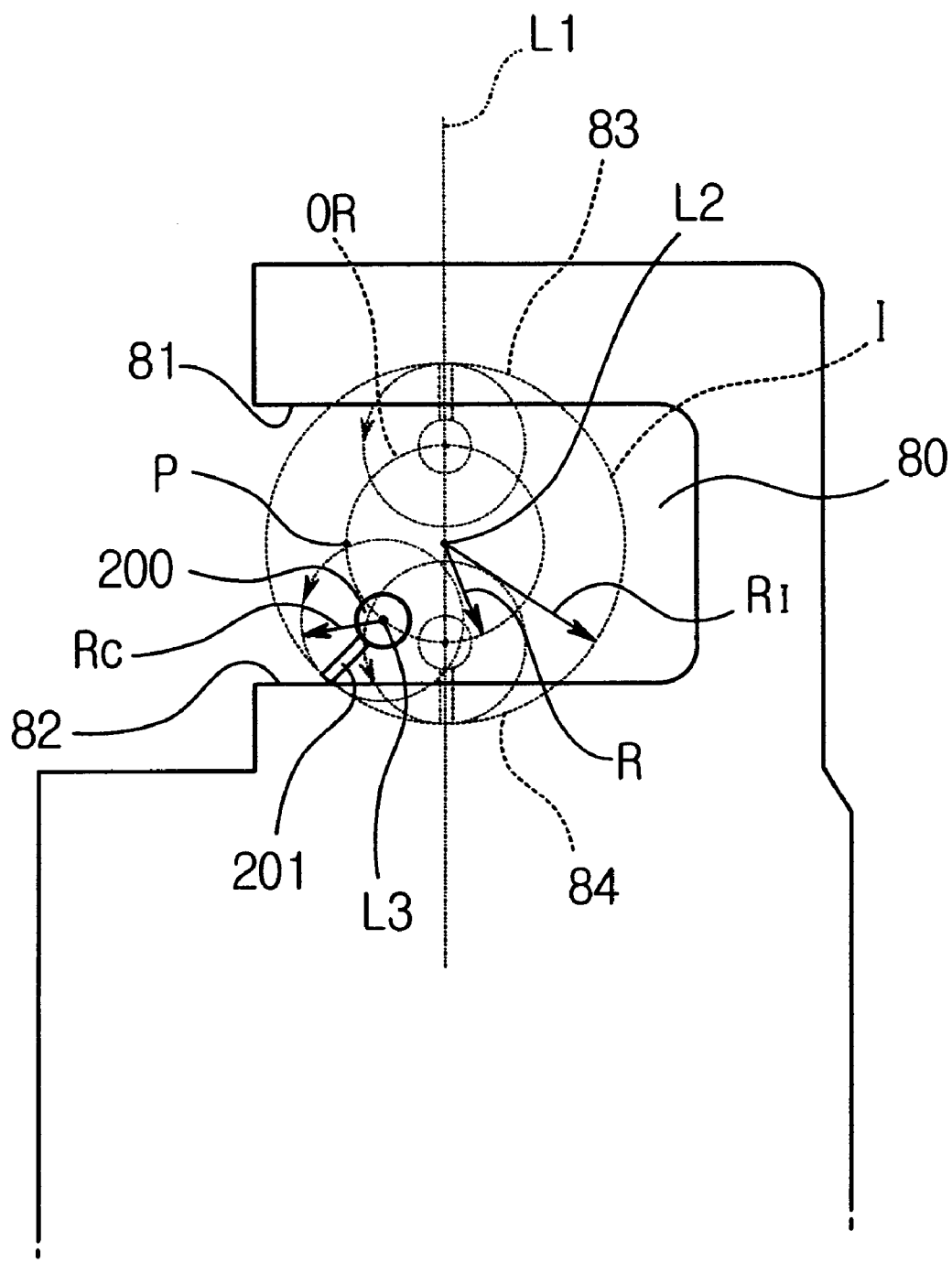
FIG. 5 is a view showing a shoe pocket machining method in accordance with a first embodiment of the present invention.

FIG. 5 is a view showing a shoe pocket machining method in accordance with a first embodiment of the present invention.

As shown in FIG. 5, in the shoe pocket machining method in accordance with the first embodiment of the present invention, the rotated cutter 200 is moved forward to the midpoint P of the entrance of the slot 80 that is spaced apart from the central axis $L_2$ of the slot 80 by a radius R obtained by subtracting the rotation radius $R_c$ of the cutter 200 from the radius $R_I$ of the imaginary sphere I. Thereafter, the cutter 200 is rotated around its rotation axis $L_3$ and, at the same time, is revolved from the point P along a circular orbit OR spaced apart from the central axis $L_2$ of the slot 80 by a radius R, so that the shoe pockets 83 and 84 are cut on the two opposed walls 81 and 82 of the slot 80. When one round revolution is completed and the cutter 200 reaches the initial position, or the point P, the cutter 200 stops its rotation and revolution and is retreated out of the slot 80, thereby completing the machining of the shoe pockets 83 and 84.

In the shoe pocket machining method in accordance with the first embodiment of the present invention, since the piston 8 is fixed on a fixing stand (not shown) and the shoe pockets 83 and 84 are cut by the rotation and revolution of the cutter 200 respectively around parallel rotation and revolution axes, the distance between the shoe pockets 83 and 84 can be adjusted as desired and the surfaces of the shoe pockets 83 and 84 can be cut to conform to the single imaginary sphere I.

Therefore, the shoe pocket machining method according to the first embodiment of the present invention is capable of greatly improving the dimensional precision of machining in comparison with the conventional shoe pocket machining method in which the shoe pockets are cut using the combination of two movements, that is, a rotation movement of a piston and a linear movement of a cutter, having different characteristics, thereby reducing the defects of pistons that are generated in the process of machining the shoe pockets.

Figure 6:
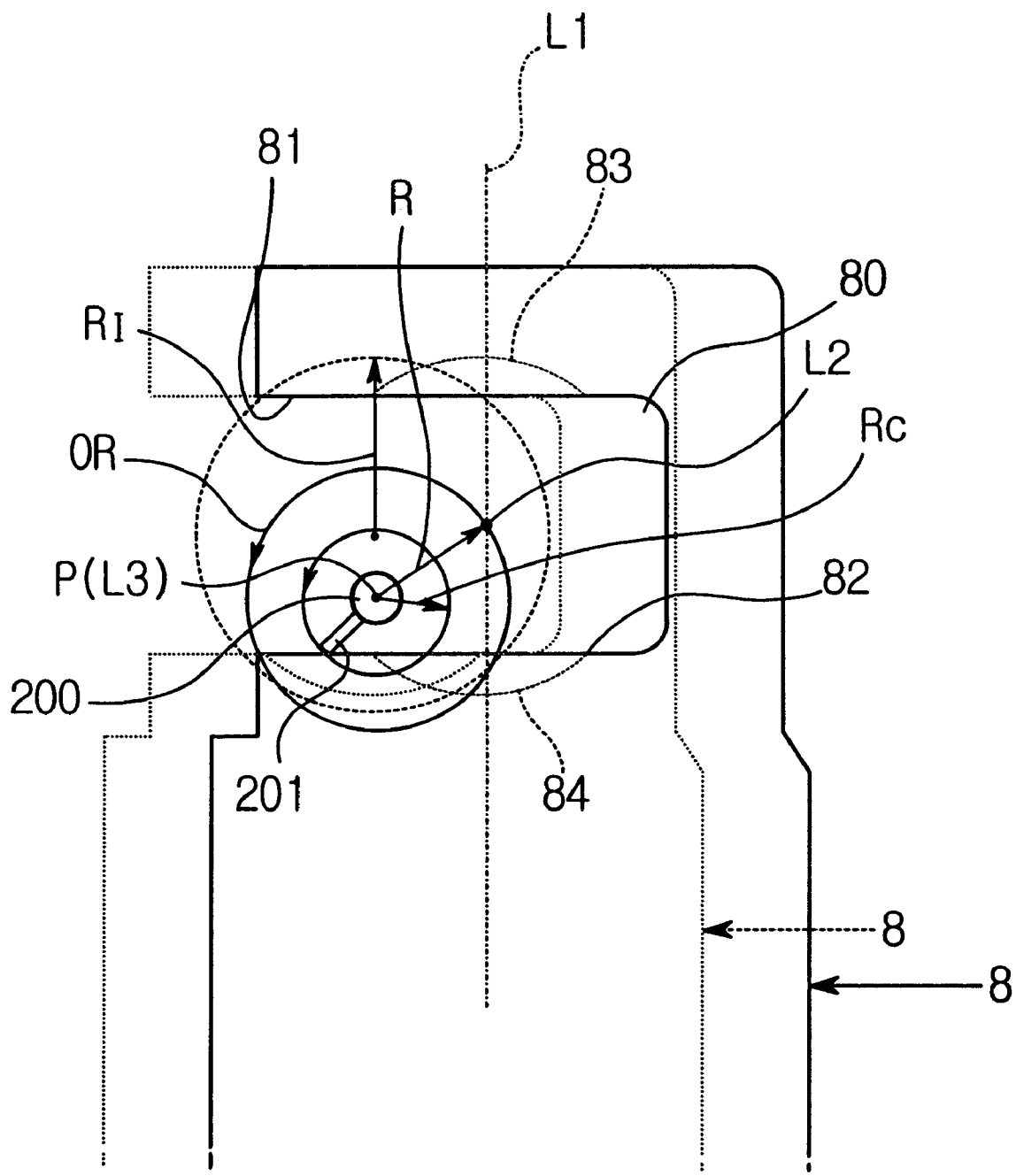
FIG. 6 is a view showing a shoe pocket machining method in accordance with a second embodiment of the present invention.

FIG. 6 is a view showing a shoe pocket machining method in accordance with a second embodiment of the present invention.

In the shoe pocket machining method of the second embodiment, the shoe pockets 83 and 84 are cut in such a way that the piston 8 is revolved around a cutter 200 while the rotation axis $L_3$ of the cutter 200 is fixed, differently from the shoe pocket machining method of the first embodiment wherein the shoe pockets 83 and 84 are cut in such a way that the cutter 200 is rotated and revolved while the piston 8 is fixed.

In more detail, as illustrated in FIG. 6, in the shoe pocket machining method in accordance with the second embodiment of the present invention, the shoe pockets 83 and 84 are cut on the opposed walls 81 and 82 of a slot 80 by revolving the piston 8 around the cutter 200 without rotating the piston 8, in such a way that the central axis $L_2$ of the slot 80 is allowed to be moved along a circular orbit OR spaced apart from the rotation axis $L_3$ of the cutter 200 by a radius R ($R_1-R_c$), while fixing the rotation axis $L_3$ of the cutter 200 at the midpoint P of the entrance of the slot 80. The phantom lines of FIG. 6 depict the positional variation of the piston 8.

The shoe pocket machining method of the second embodiment is different from the shoe pocket machining method of the first embodiment only in that the piston 8 is revolved instead of the revolution of the cutter 200. Therefore, the shoe pockets are identically cut in both shoe pocket machining methods of the first and second embodiments, and their technical effects are the same.

As described above, the present invention provides a method for machining a pair of shoe pockets for piston in a swash plate type compressor, which is capable of cutting shoe pockets, which conform to a single imaginary sphere, on the opposed walls of a piston slot by rotating a cutter having an arc-shaped cutter blade and, simultaneously, revolving it around the axis of the piston slot, thereby not only improving the dimensional precision of machining but also allowing dimensions to be easily managed. As a result, the defects of pistons generated in the process of cutting shoe pockets can be reduced, thereby reducing the manufacturing cost of the piston.

In addition, since shoes can be angularly displaced on shoe pockets without hindrance owing to the precise machining of the shoe pockets, the friction between a swash plate and a piston can be reduced in the operation of a compressor, thereby not only improving the compression performance of the compressor but also reducing the occurrence of noise.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for machining a piston for use with a swash plate compressor, the method comprising:

providing a piston comprising a slot, the slot having two opposing walls;

moving a cutter provided with an arc-shaped cutter blade into the slot, the blade adapted to rotate about an axis of the cutter, the rotation diameter of the cutter being less than a width of the slot;

relatively revolving the cutter with regard to the piston by allowing the axis of the cutter to move along a circular orbit within the slot while rotating the cutter, so as to form a pair of shoe pockets on the opposing walls of the slot, the shoe pockets having a curvature which is a portion of the curvature of a single imaginary sphere; and retreating the cutter out of the slot after the cutter completes a single revolution.

2. The method of claim 1, wherein the relatively revolving the cutter with regard to the piston is performed by allowing the rotation axis of the cutter to move along the circular orbit within the slot while the piston is substantially fixed.

3. The method of claim 1, wherein the relatively revolving the cutter with regard to the piston is performed by allowing the piston to move along the circular orbit within the slot while the rotation axis of the cutter is substantially fixed.

* * * * *